US009176446B2

(12) United States Patent
Noren et al.

(10) Patent No.: US 9,176,446 B2
(45) Date of Patent: Nov. 3, 2015

(54) DETERMINING MEDIA SIZE BY MONITORING USAGE

(71) Applicant: XEROX CORPORATION, Norwalk, CT (US)

(72) Inventors: Andrew Stephen Noren, Hemel Hempstead (GB); David Gray, Welwyn Garden (GB); Simon Gray, Westoning (GB)

(73) Assignee: Xerox Corporation, Norwalk, CT (US)

( * ) Notice: Subject to any disclaimer, the term of this patent is extended or adjusted under 35 U.S.C. 154(b) by 47 days.

(21) Appl. No.: 14/087,463

(22) Filed: Nov. 22, 2013

(65) Prior Publication Data

US 2015/0147072 A1 May 28, 2015

(51) Int. Cl.
*G06F 15/00* (2006.01)
*G03G 15/00* (2006.01)

(52) U.S. Cl.
CPC .......... *G03G 15/502* (2013.01); *G03G 15/6502* (2013.01); *G03G 15/6594* (2013.01)

(58) Field of Classification Search
CPC ............ G03G 15/502; G03G 15/6502; G03G 15/6594
USPC ........................................................ 358/1.15
See application file for complete search history.

(56) References Cited

U.S. PATENT DOCUMENTS 5,574,551 A 11/1996 Kazakoff
6,032,004 A 2/2000 Mirabella, Jr. et al.
6,633,052 B2 10/2003 Walters et al.
8,387,972 B1 3/2013 Ledgerwood et al.
2007/0189783 A1 * 8/2007 Hattori ............................ 399/16
2010/0201063 A1 8/2010 Ohno et al.
2011/0127714 A1 6/2011 Kuo

* cited by examiner

*Primary Examiner* — Saeid Ebrahimi Dehkordy
(74) *Attorney, Agent, or Firm* — Gibb & Riley, LLC

(57) ABSTRACT

Devices and methods to determine media size in a printing device. Media being added to a media sheet tray of a printing device is detected. A size of the media in the tray is estimated based only on at least one of: a size of the media in the tray prior to the media being added, a size of the media recently used prior to the media being added, and a size of the media most frequently used. A selection of previously used sizes of media is displayed on a user interface. The selection comprises: the size of the media in the tray prior to the media being added, the size of the media recently used prior to the media being added, and the size of the media most frequently used. Confirmation of the size of the media added to the tray is received, on the user interface.

20 Claims, 4 Drawing Sheets

DETERMINING MEDIA SIZE BY MONITORING USAGE

BACKGROUND

Devices and methods herein generally relate to machines such as printers and/or copier devices and, more particularly, to methods to determine media size in the device.

Most media trays detect a range of paper sizes by altering guides, which in turn actuate mechanical switches. This is prone to inaccuracy and also requires a mechanical or electrical connection between the tray guides and the machine, which can cause reliability problems. Furthermore, such use of switches and mechanics is expensive.

SUMMARY

Disclosed herein is a fast and efficient method for determining the media size in a media sheet tray of a printing device by monitoring customer usage, and backing this up with confirmation to the user and by timing the paper feeding. According to devices and methods herein, the media size can be determined without using any size sensing apparatus in the media sheet tray.

According to a method herein, media being added to a media sheet tray of a printing device is automatically detected. The media sheet tray is devoid of sensors determining the size of the media. A size of the media in the media sheet tray is automatically estimated based only on at least one of: a size of the media in the media sheet tray prior to the media being added to the media sheet tray, a size of the media recently used prior to the media being added to the media sheet tray, and a size of the media most frequently used. A selection of previously used sizes of media is automatically displayed on a user interface of the printing device. The selection comprises: the size of the media in the media sheet tray prior to the media being added to the media sheet tray, the size of the media recently used prior to the media being added to the media sheet tray, and the size of the media most frequently used. Confirmation of the size of the media added to the media sheet tray is received, on the user interface.

According to a computer-implemented method, media sheet usage of printing devices in a network is tracked, using a computerized device. The usage comprises the quantity of sheets, the size of the sheets, and the dates of use. A most popular media sheet size is determined based on the quantity of sheets for each size, using the computerized device. Media being added to a media sheet tray of a printing device in the network is detected, using the computerized device. The media sheet tray is devoid of sensors determining the size of the media. A size of the media in the media sheet tray is automatically estimated based only on at least one of: a size of the media in the media sheet tray prior to the media being added to the media sheet tray, a size of the media recently used prior to the media being added to the media sheet tray, a size of the media most frequently used, and a size of the most popular media sheet. A selection of sizes of media is displayed on a user interface, using the computerized device. The selection comprises: the size of the media in the media sheet tray prior to the media being added to the media sheet tray, the size of the media recently used prior to the media being added to the media sheet tray, the size of the media most frequently used, and the size of the most popular media sheet. Confirmation of the size of the media added to the media sheet tray is received on the user interface, by the computerized device.

According to a printing device herein, the printing device comprises a processor, a printing engine operatively connected to the processor, a tray slot operatively connected to the processor, and a media sheet tray connecting to the tray slot. The media sheet tray is devoid of sensors determining the size of the media. The processor detects the media sheet tray being slid out of the tray slot. The processor detects media being added to the media sheet tray. The processor detects the media sheet tray being slid into the tray slot. The processor estimates the size of the media in the media sheet tray based only on at least one of: the size of the media in the media sheet tray prior to the media being added to the media sheet tray, the size of the media recently used prior to the media being added to the media sheet tray, and the size of the media most frequently used. The processor displays on a user interface a selection of previously used sizes of media. The selection comprises: the size of the media in the media sheet tray prior to the media being added to the media sheet tray, the size of the media recently used prior to the media being added to the media sheet tray, and the size of the media most frequently used. The processor receives on the user interface, confirmation of the size of the media added to the media sheet tray. The processor informs the printing engine of the size of the media in the media sheet tray.

These and other features are described in, or are apparent from, the following detailed description.

BRIEF DESCRIPTION OF THE DRAWINGS

Various examples of the devices and methods are described in detail below, with reference to the attached drawing figures, which are not necessarily drawn to scale and in which:

FIG. 3 is a plan view of a user interface according to devices and methods herein.

DETAILED DESCRIPTION

Figure 1:
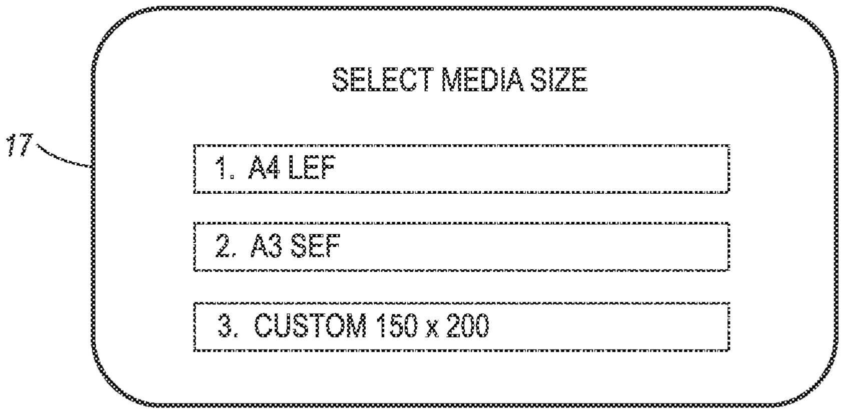
FIG. 1 is a plan view of a user interface according to devices and methods herein.

The disclosure will now be described by reference to a printing apparatus that includes a device and method for determining a size of media in a media sheet tray of the printer. While the disclosure will be described hereinafter in connection with specific devices and methods thereof, it will be understood that limiting the disclosure to such specific devices and methods is not intended. On the contrary, it is intended to cover all alternatives, modifications, and equivalents as may be included within the spirit and scope of the disclosure as defined by the appended claims.

For a general understanding of the features of the disclosure, reference is made to the drawings. In the drawings, like reference numerals have been used throughout to identify identical elements.

According to devices and methods herein, a printing device keeps track of which paper sizes the customer has used from individual trays and when they have used the tray. A combination of the most recently used sizes and most frequently used sizes are then used to populate a confirmation screen for the user when a given selectable tray is closed. For example, a user opens the paper tray; the user inserts some new paper into the tray; and then closes the tray. The user is then asked to confirm the paper size in the tray. According to devices and methods herein, the paper size can be determined without using any size sensing apparatus in the sheet tray.

FIG. 1 shows an example of a user interface according to devices and methods herein. The display may take into account the paper size preference (e.g. whether paper size is displayed in inches or metric). Referring to FIG. 1, a selection of previously used paper sizes is shown to the user on a graphic user interface (GUI) or control panel 17.

1. The paper size used prior to the tray being opened is selected as the default.
2. The most recent paper size prior to opening the paper tray.
3. The most frequently used paper size.
4. Optionally, a custom paper size.
5. Optionally, other paper sizes that can possibly be used.

The number of possible selections to display can vary depending on the display size. According to devices and methods herein, the weighting of recent usage vs. most frequent usage can be tuned and configured by the user.

Below is an example of paper usage to demonstrate how the method described herein may operate. Looking back in time at the previous changes in paper size on a tray (most recent being listed first):

200 sheets marked of A4 LEF selected on December $2^{nd}$
100 sheets marked of A3 SEF selected on November $22^{nd}$
5000 sheets marked of A4 LEF selected on October $3^{rd}$
100 sheets marked of A3 SEF selected on September $23^{rd}$
40 sheets marked of Custom 150 mm×200 mm selected on September $2^{nd}$
50 sheets marked of A5 SEF selected on September $2^{nd}$
100 sheets marked of A4 SEF selected on August $22^{nd}$
4000 sheets marked of A4 LEF selected on August $15^{th}$ Given the usage above, the selections displayed on the GUI or control panel 17 would include:

1. A4 LEF
2. A3 SEF
3. Custom 150×200

Note: the first selection (A4 LEF) is provided as the default, since it was the most recently used. In this example, A4 LEF is also used most often. The second selection (A3 SEF) is provided as the most recent to A4 LEF. The third selection (Custom 150×200) is provided as most recent after A3 SEF. According to this example, if the display list can be longer than three elements, the next selection as the next most recent would be A5 SEF, followed by A4 SEF. Other sizes may also be shown, such as a list of sizes never used, used little, or only used a long time ago (e.g. B4 SEF, A4 LEFTabs, etc.). According to devices and methods herein, a custom list could be provided that contains a list to remember the previous custom sizes a user has selected.

As described in more detail below, the printing device of the above example may be connected to a network. The network may be any type of network, including a local area network (LAN), a wide area network (WAN), or a global computer network, such as the Internet. According to devices and methods herein, media sheet usage of printing devices in the network may be tracked. Such usage comprises the quantity of sheets, the size of the sheets, and the dates of use for various printing devices in the network. A most popular media sheet size may be determined for the printing devices on the network. The most popular may be based on the quantity of sheets for each size, the time of usage of each size, etc.

Figure 2:
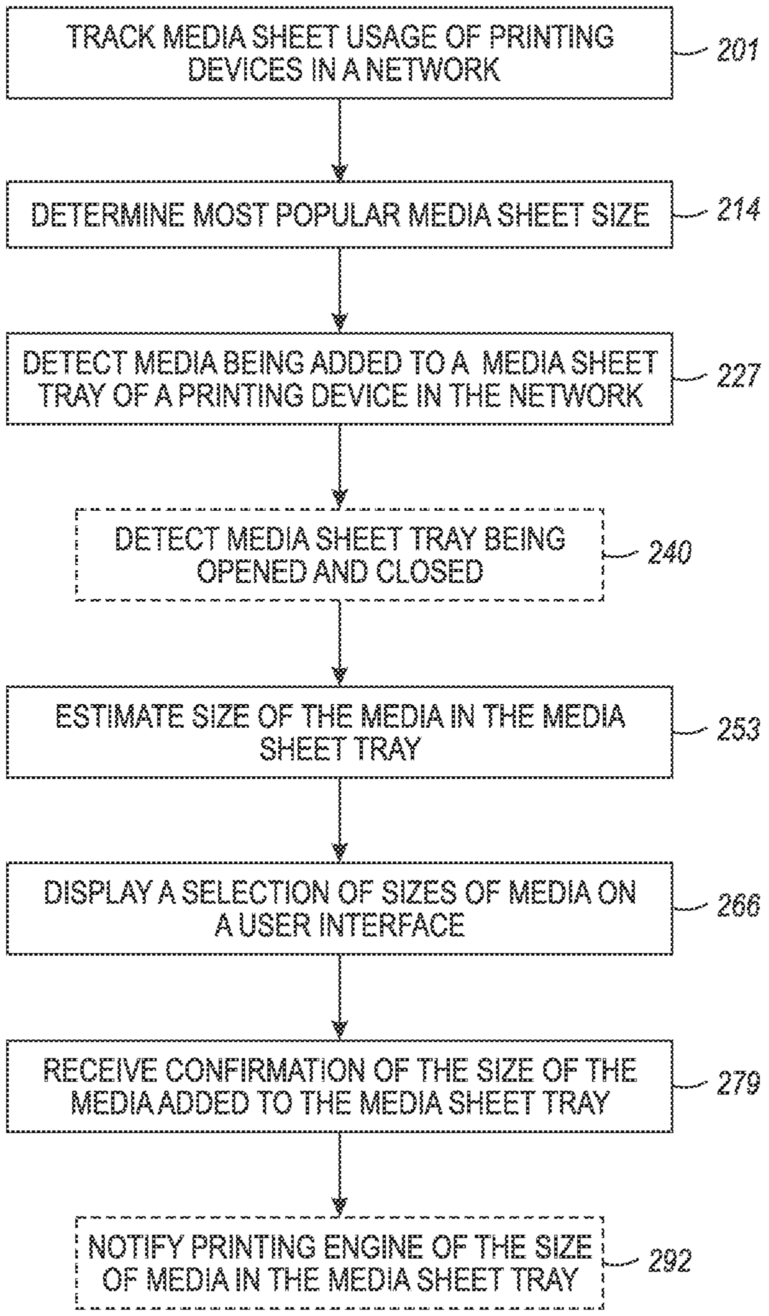
FIG. 2 is a flow diagram illustrating methods herein.

FIG. 2 is a flow diagram illustrating the processing flow of an exemplary method according to devices and methods herein. At 201, media sheet usage of printing devices in a network is tracked. The usage comprises the quantity of sheets, the size of the sheets, and the dates of use. At 214, a most popular media sheet size is determined based on the quantity of sheets for each size. Media being added to a media sheet tray of a printing device in the network is detected, at 227. The media being added to the media sheet tray may be detected by detecting the media sheet tray being opened and closed, at 240. A size of the media in the media sheet tray is automatically estimated, at 253. The size estimation is based only on at least one of: a size of the media in the media sheet tray prior to the media being added to the media sheet tray, a size of the media recently used prior to the media being added to the media sheet tray, a size of the media most frequently used, and a size of the most popular media sheet. At 266, a selection of sizes of media is displayed on a user interface. The selection of sizes displayed on the user interface comprises: the size of the media in the media sheet tray prior to the media being added to the media sheet tray, the size of the media recently used prior to the media being added to the media sheet tray, the size of the media most frequently used, and the size of the most popular media sheet. Confirmation of the size of the media added to the media sheet tray is received on the user interface, at 279. At 292, the printing engine of the printing device may be notified of the size of the media in the media sheet tray.

According to devices and methods herein, it is contemplated that the correct media selection in the process direction can be determined or confirmed by software associated with the print engine after the printing device has successfully fed a first sheet from the media sheet tray. If the sheet does not match the size selected on the user interface, a media mismatch error can be signaled to the user for reconfirmation. Such signaling may be done on the GUI or control panel 17.

Figure 3:
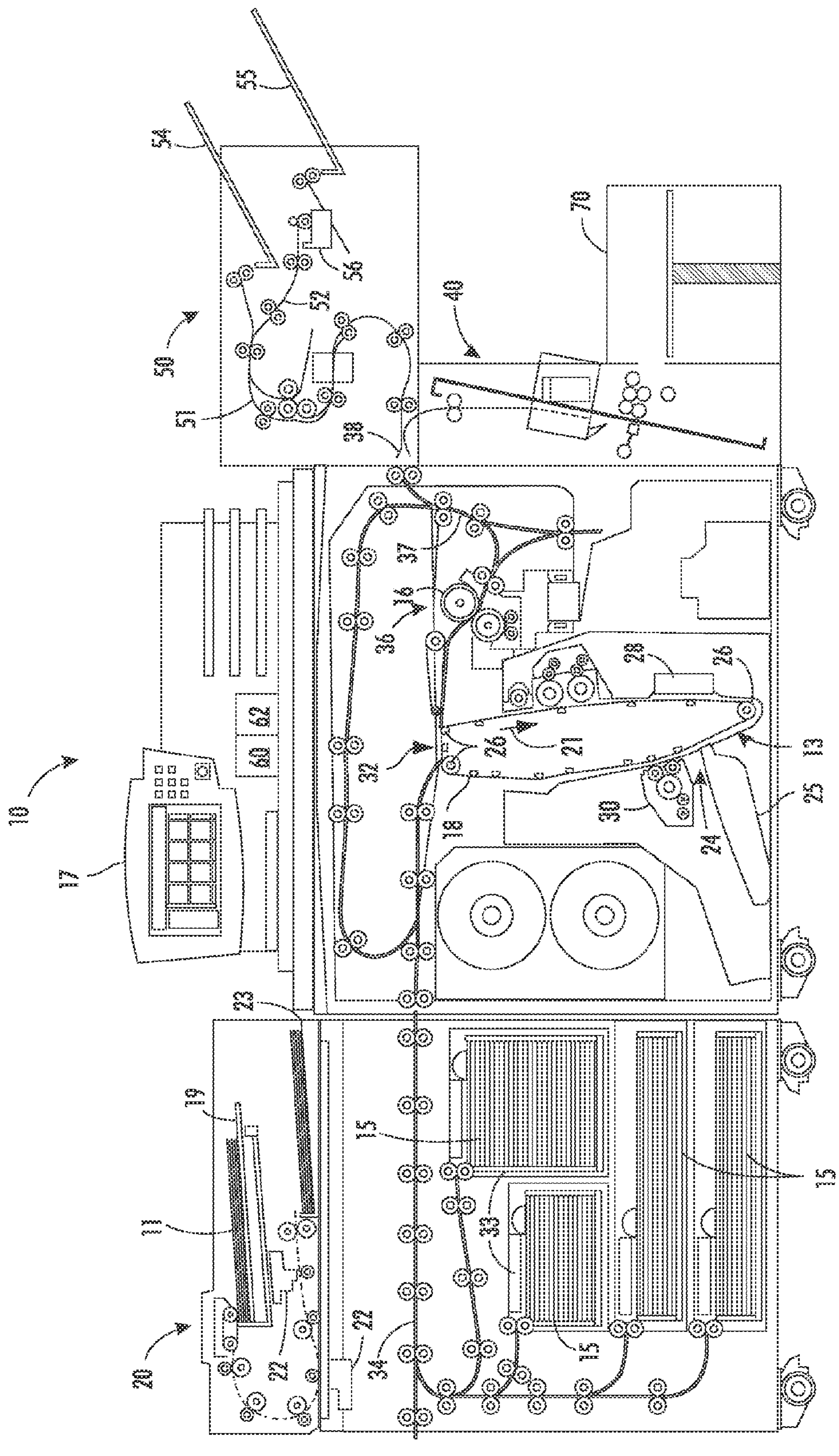
FIG. 3 is a side-view schematic diagram of a device according to devices and methods herein.

Referring to the FIG. 3 a printing device 10 is shown which can be used with devices and methods herein and can comprise, for example, a printer, copier, multi-function machine, multi-function device (MFD), etc. The printing device 10 includes an automatic document feeder 20 (ADF) that can be used to scan (at a scanning station 22) original documents 11 fed from a first tray 19 to a second tray 23. The user may enter the desired printing and finishing instructions through the graphic user interface (GUI) or control panel 17, or use a job ticket, an electronic print job description from a remote source, etc. The GUI or control panel 17 can include one or more processors 60, power supplies, as well as storage devices 62 storing programs of instructions that are readable by the processors 60 for performing the various functions described herein. The storage devices 62 can comprise, for example, non-volatile storage mediums including magnetic devices, optical devices, capacitor-based devices, etc.

An electronic or optical image or an image of an original document or set of documents to be reproduced may be projected or scanned onto a charged surface 13 or a photoreceptor belt 18 to form an electrostatic latent image. The photoreceptor belt 18 is mounted on a set of rollers 26. At least one of the rollers 26 is driven to move the photoreceptor belt 18 in the direction indicated by arrow 21 past the various other known electrostatic processing stations, including a charging station 28, imaging station 24 (for a raster scan laser system 25), developing station 30, and transfer station 32.

Thus, the latent image is developed with developing material to form a toner image corresponding to the latent image. More specifically, a sheet of print media 15 is fed from a selected media sheet tray 33 having a supply of paper to a sheet transport 34 for travel to the transfer station 32. There, the toned image is electrostatically transferred to the print media 15, to which it may be permanently fixed by a fusing device 16. The sheet is stripped from the photoreceptor belt 18 and conveyed to a fusing station 36 having fusing device

16 where the toner image is fused to the sheet. A guide can be applied to the print media 15 to lead it away from the fuser roll. After separating from the fuser roll, the print media 15 is then transported by a sheet output transport 37 to output trays in a multi-functional finishing station 50.

Printed sheets from the printing device 10 can be accepted at an entry port 38 and directed to multiple paths and output trays for printed sheets, top tray 54 and main tray 55, corresponding to different desired actions, such as stapling, hole-punching and C or Z-folding. The multi-functional finishing station 50 can also optionally include, for example, a modular booklet maker 40 although those ordinarily skilled in the art would understand that the multi-functional finishing station 50 could comprise any functional unit, and that the modular booklet maker 40 is merely shown as one example. The finished booklets are collected in a stacker 70. It is to be understood that various rollers and other devices that contact and handle sheets within the multi-functional finishing station 50 are driven by various motors, solenoids, and other electromechanical devices (not shown), under a control system, such as including the processor 60 of the GUI or control panel 17 or elsewhere, in a manner generally familiar in the art. The processor 60 may comprise a microprocessor.

Thus, the multi-functional finishing station 50 has a top tray 54 and a main tray 55 and a folding and booklet making station that adds stapled and unstapled booklet making, and single sheet C-fold and Z-fold capabilities. The top tray 54 is used as a purge destination, as well as, a destination for the simplest of jobs that require no finishing and no collated stacking. The main tray 55 can have, for example, a pair of pass-through staplers 56 and is used for most jobs that require stacking or stapling. The folding destination is used to produce signature booklets, saddle stitched or not, and tri-folded. The finished booklets are collected in a stacker 70. Sheets that are not to be C-folded, Z-folded, or made into booklets or that do not require stapling are forwarded along path 51 to top tray 54. Sheets that require stapling are forwarded along path 52, stapled with staplers 56, and deposited into the main tray 55.

As would be understood by those ordinarily skilled in the art, the printing device 10 shown in FIG. 3 is only one example and the devices and methods herein are equally applicable to other types of printing devices that may include fewer components or more components. For example, while a limited number of printing engines and paper paths are illustrated in FIG. 3, those ordinarily skilled in the art would understand that many more paper paths and additional printing engines could be included within any printing device used with devices and methods herein.

Figure 4:
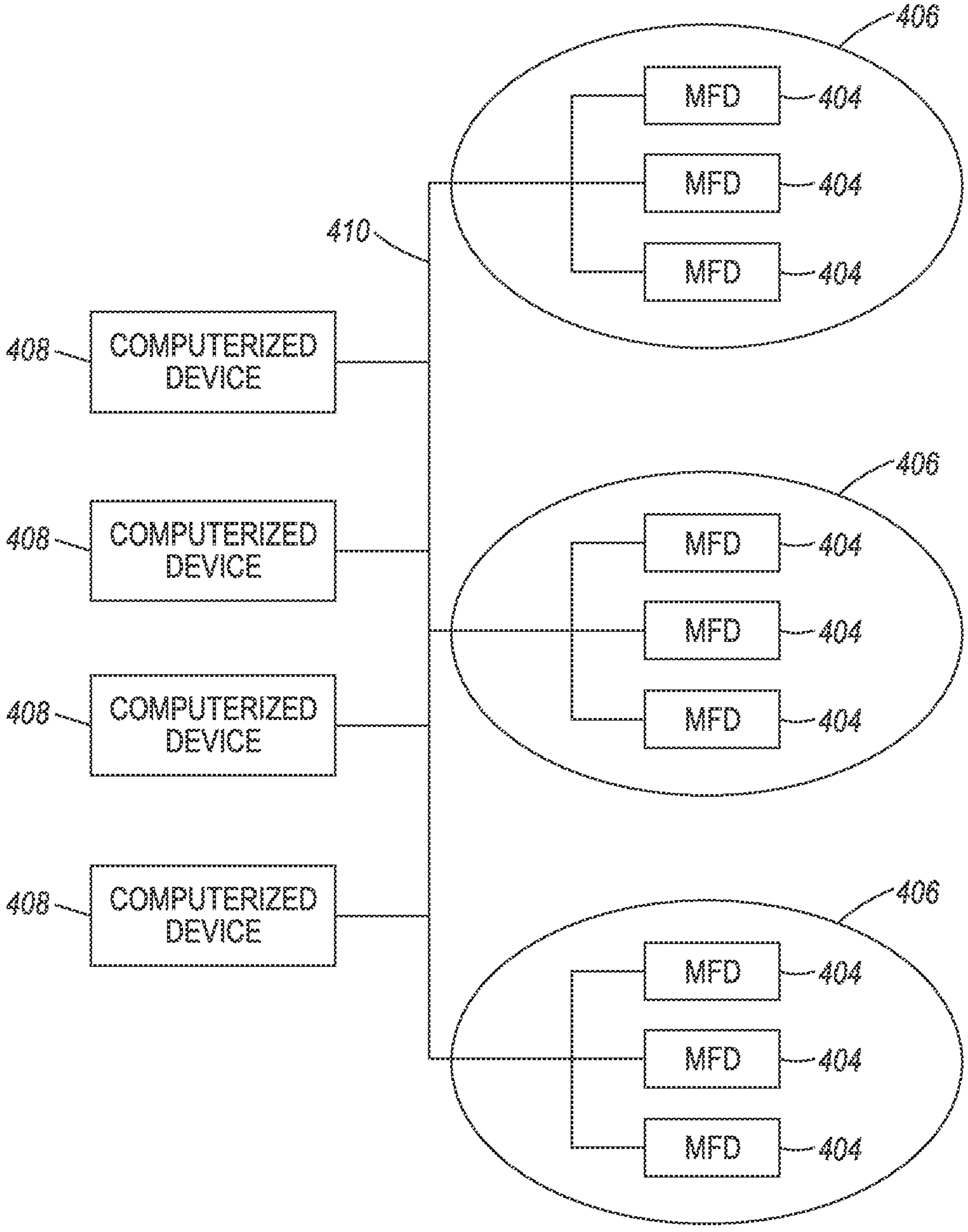
FIG. 4 is a schematic diagram illustrating devices and methods herein.

As shown in FIG. 4, exemplary printers, copiers, multi-function machines, and multi-function devices (MFD) 404 may be located at various different physical locations 406. Other devices according to devices and methods herein may include various computerized devices 408. The computerized devices 408 can include print servers, printing devices, personal computers, etc., and are in communication (operatively connected to one another) by way of a network 410. The network 410 may be any type of network, including a local area network (LAN), a wide area network (WAN), or a global computer network, such as the Internet.

Aspects of the present disclosure are described herein with reference to flowchart illustrations and/or block diagrams of methods, apparatus (systems), and computer program products according to various devices and methods. It will be understood that each block of the flowchart illustrations and/or two-dimensional block diagrams, and combinations of blocks in the flowchart illustrations and/or block diagrams, can be implemented by computer program instructions. The computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

According to a further device and method herein, an article of manufacture is provided that includes a tangible computer readable medium having computer readable instructions embodied therein for performing the steps of the computer implemented methods, including, but not limited to, the method illustrated in FIG. 2. Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. Any of these devices may have computer readable instructions for carrying out the steps of the methods described above with reference to FIG. 2.

The computer program instructions may be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

Furthermore, the computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

In case of implementing the devices and methods herein by software and/or firmware, a program constituting the software may be installed into a computer with dedicated hardware, from a storage medium or a network, and the computer is capable of performing various functions if with various programs installed therein.

In the case where the above-described series of processing is implemented with software, the program that constitutes the software may be installed from a network such as the Internet or a storage medium such as the removable medium. Examples of a removable medium include a magnetic disk (including a floppy disk), an optical disk (including a Compact Disk-Read Only Memory (CD-ROM) and a Digital Versatile Disk (DVD)), a magneto-optical disk (including a Mini-Disk (MD) (registered trademark)), and a semiconductor memory. Alternatively, the storage medium may be the ROM, a hard disk contained in the storage section of the disk units, or the like, which has the program stored therein and is distributed to the user together with the device that contains them.

As will be appreciated by one skilled in the art, aspects of the devices and methods herein may be embodied as a system, method, or computer program product. Accordingly, aspects of the present disclosure may take the form of an entirely hardware system, an entirely software system (including firmware, resident software, micro-code, etc.) or an system combining software and hardware aspects that may all generally be referred to herein as a "circuit," "module", or "system." Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium include the following: an electrical connection having one or more wires, a portable computer diskette, a hard disk, a random access memory (RAM), a Read Only Memory (ROM), an Erasable Programmable Read Only Memory (EPROM or Flash memory), an optical fiber, a magnetic storage device, a portable compact disc Read Only Memory (CD-ROM), an optical storage device, a "plug-and-play" memory device, like a USB flash drive, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including, but not limited to, wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++, or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The flowchart and block diagrams in the figures illustrate the architecture, functionality, and operation of possible implementations of systems, methods, and computer program products according to various devices and methods herein. In this regard, each block in the flowchart or block diagrams may represent a module, segment, or portion of code, which comprises one or more executable instructions for implementing the specified logical function(s). It should also be noted that, in some alternative implementations, the functions noted in the block might occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Many computerized devices are discussed above. Computerized devices that include chip-based central processing units (CPU's), input/output devices (including graphic user interfaces (GUI), memories, comparators, processors, etc. are well-known and readily available devices produced by manufacturers such as Dell Computers, Round Rock Tex., USA and Apple Computer Co., Cupertino Calif., USA. Such computerized devices commonly include input/output devices, power supplies, processors, electronic storage memories, wiring, etc., the details of which are omitted herefrom to allow the reader to focus on the salient aspects of the embodiments described herein. Similarly, scanners and other similar peripheral equipment are available from Xerox Corporation, Norwalk, Conn., USA and the details of such devices are not discussed herein for purposes of brevity and reader focus.

The terms printer or printing device as used herein encompasses any apparatus, such as a digital copier, bookmaking machine, facsimile machine, multi-function machine, etc., which performs a print outputting function for any purpose. The details of printers, printing engines, etc., are well known by those ordinarily skilled in the art and are discussed in, for example, U.S. Pat. No. 6,032,004, the complete disclosure of which is fully incorporated herein by reference. The devices and methods herein can encompass devices that print in color, monochrome, or handle color or monochrome image data. All foregoing devices and methods are specifically applicable to electrostatographic and/or xerographic machines and/or processes.

The terminology used herein is for the purpose of describing particular devices and methods only and is not intended to be limiting of this disclosure. As used herein, the singular forms "a", "an", and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

In addition, terms such as "right", "left", "vertical", "horizontal", "top", "bottom", "upper", "lower", "under", "below", "underlying", "over", "overlying", "parallel", "perpendicular", etc., used herein, are understood to be relative locations as they are oriented and illustrated in the drawings (unless otherwise indicated). Terms such as "touching", "on", "in direct contact", "abutting", "directly adjacent to", etc., mean that at least one element physically contacts another element (without other elements separating the described elements). Further, the terms 'automated' or 'automatically' mean that once a process is started (by a machine or a user), one or more machines perform the process without further input from any user.

The corresponding structures, materials, acts, and equivalents of all means or step plus function elements in the claims below are intended to include any structure, material, or act for performing the function in combination with other claimed elements as specifically claimed. The descriptions of the various devices and methods of the present disclosure have been presented for purposes of illustration, but are not intended to be exhaustive or limited to the devices and methods disclosed. Many modifications and variations will be apparent to those of ordinary skill in the art without departing from the scope and spirit of the described devices and methods. The terminology used herein was chosen to best explain the principles of the devices and methods, the practical application or technical improvement over technologies found in the marketplace, or to enable others of ordinary skill in the art to understand the devices and methods disclosed herein.

It will be appreciated that the above-disclosed and other features and functions, or alternatives thereof, may be desirably combined into many other different systems or applications. Those skilled in the art may subsequently make various presently unforeseen or unanticipated alternatives, modifications, variations, or improvements therein, which are also intended to be encompassed by the following claims. Unless specifically defined in a specific claim itself, steps or components of the devices and methods herein should not be implied or imported from any above example as limitations to any particular order, number, position, size, shape, angle, color, temperature, or material.

What is claimed is:

1. A method comprising:

automatically detecting media being added to a media sheet tray of a printing device, said media sheet tray being devoid of sensors determining a size of said media;

automatically estimating said size of said media in said media sheet tray based only on at least one of:

a size of said media in said media sheet tray prior to said media being added to said media sheet tray, a size of said media recently used prior to said media being added to said media sheet tray, and a size of said media most frequently used;

automatically displaying on a user interface of said printing device a selection of previously used sizes of media, said selection comprising:

said size of said media in said media sheet tray prior to said media being added to said media sheet tray, said size of said media recently used prior to said media being added to said media sheet tray, and said size of said media most frequently used; and receiving, on said user interface, confirmation of said size of said media added to said media sheet tray.

2. The method according to claim 1, said detecting media being added to a media sheet tray of a printing device comprising detecting said media sheet tray being opened and closed.

3. The method according to claim 1, said estimating a size of said media in said media sheet tray comprising a combination of most recently used media sizes and most frequently used media sizes.

4. The method according to claim 1, further comprising:

automatically tracking media sheet usage of printing devices in a network, said usage comprising quantity of sheets, size of said sheets, and dates of use; and automatically determining a most popular media sheet size for said printing devices in said network.

5. The method according to claim 4, further comprising:

automatically displaying on said user interface of said printing device a selection of said most popular media sheet size for said printing devices in said network.

6. The method according to claim 1, further comprising:

automatically confirming said size of said media added to said media sheet tray based on said printing device successfully feeding a sheet from said media sheet tray.

7. A computer-implemented method, comprising:

tracking media sheet usage of printing devices in a network, using a computerized device, said usage comprising quantity of sheets, size of said sheets, and dates of use;

determining a most popular media sheet size based on said quantity of sheets for each size, using said computerized device;

detecting media being added to a media sheet tray of a printing device in said network, using said computerized device, said media sheet tray being devoid of sensors determining a size of said media;

automatically estimating said size of said media in said media sheet tray based only on at least one of:

a size of said media in said media sheet tray prior to said media being added to said media sheet tray, a size of said media recently used prior to said media being added to said media sheet tray, a size of said media most frequently used, and a size of said most popular media sheet;

displaying on a user interface a selection of sizes of media, using said computerized device, said selection comprising:

said size of said media in said media sheet tray prior to said media being added to said media sheet tray, said size of said media recently used prior to said media being added to said media sheet tray, said size of said media most frequently used, and said size of said most popular media sheet; and receiving on said user interface, by said computerized device, confirmation of a size of said media added to said media sheet tray.

8. The computer-implemented method according to claim 7, said detecting media being added to a media sheet tray comprising detecting said media sheet tray being opened and closed.

9. The computer-implemented method according to claim 7, said estimating a size of said media in said media sheet tray comprising a combination of most recently used media sizes and most frequently used media sizes.

10. The computer-implemented method according to claim 7, determining a most popular media sheet size comprising determining a most popular media sheet size for all printing devices in said network.

11. The computer-implemented method according to claim 7, further comprising:

confirming said size of said media added to said media sheet tray, using said computerized device, based on said printing device successfully feeding a sheet from said media sheet tray.

12. The computer-implemented method according to claim 11, further comprising:

responsive to said sheet not matching said size selected on said user interface signaling a media mismatch error.

13. A printing device comprising:

a processor;

a printing engine operatively connected to said processor;

a tray slot operatively connected to said processor; and a media sheet tray connecting to said tray slot, said media sheet tray being devoid of sensors determining a size of said media, said processor detecting said media sheet tray being slid out of said tray slot, said processor detecting media being added to said media sheet tray, said processor detecting said media sheet tray being slid into said tray slot, said processor estimating said size of said media in said media sheet tray based only on at least one of:

a size of said media in said media sheet tray prior to said media being added to said media sheet tray, a size of said media recently used prior to said media being added to said media sheet tray, and a size of said media most frequently used;

said processor displaying on a user interface a selection of previously used sizes of media, said selection comprising:

said size of said media in said media sheet tray prior to said media being added to said media sheet tray, said size of said media recently used prior to said media being added to said media sheet tray, and said size of said media most frequently used, said processor receiving on said user interface, confirmation of a size of said media added to said media sheet tray, and said processor informing said printing engine of said size of said media in said media sheet tray.

14. The printing device according to claim 13, said processor estimating a size of said media in said media sheet tray comprising a combination of most recently used media sizes and most frequently used media sizes.

15. The printing device according to claim 13, said printing device being in a network comprising printing devices.

16. The printing device according to claim 15, said processor tracking media sheet usage of said printing devices in said network, said usage comprising quantity of sheets, size of said sheets, and dates of use.

17. The printing device according to claim 16, said processor determining a most popular media sheet size for said printing devices in said network.

18. The printing device according to claim 17, said processor displaying on said user interface a selection of said most popular media sheet size for said printing devices in said network.

19. The printing device according to claim 13, further comprising:

said printing engine confirming said size of said media added to said media sheet tray based on said printing device successfully feeding a sheet from said media sheet tray.

20. The printing device according to claim 19, further comprising:

a signaling device, responsive to said sheet not matching said size selected on said user interface said signaling device indicating a media mismatch error.

* * * * *